L. L. GRAHAM.
ANIMAL TRAP.
APPLICATION FILED OCT. 27, 1915.
1,221,312. Patented Apr. 3, 1917.
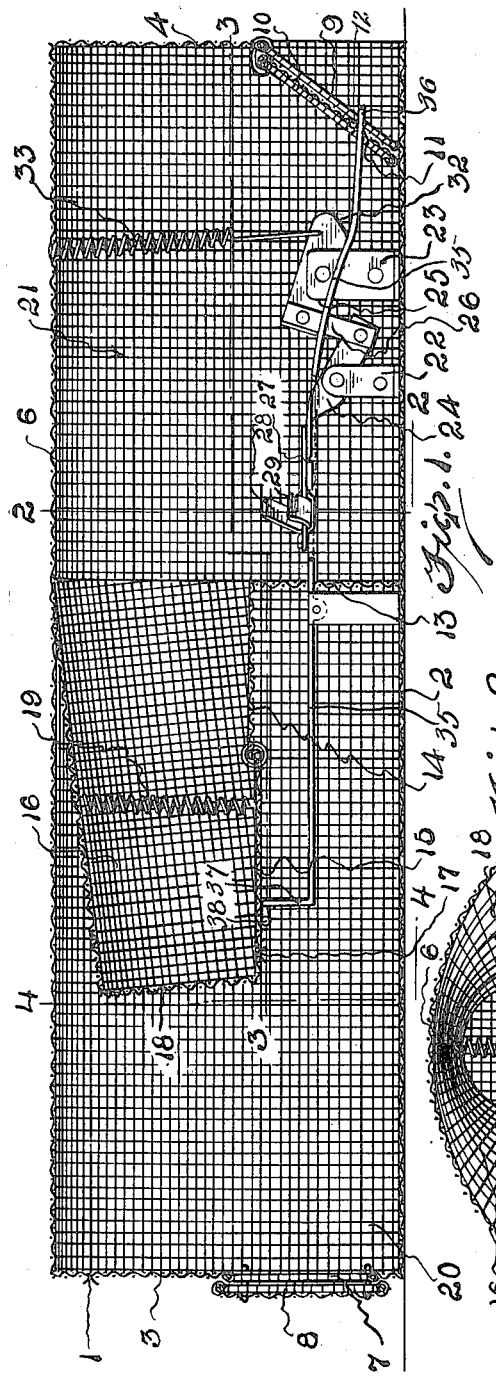
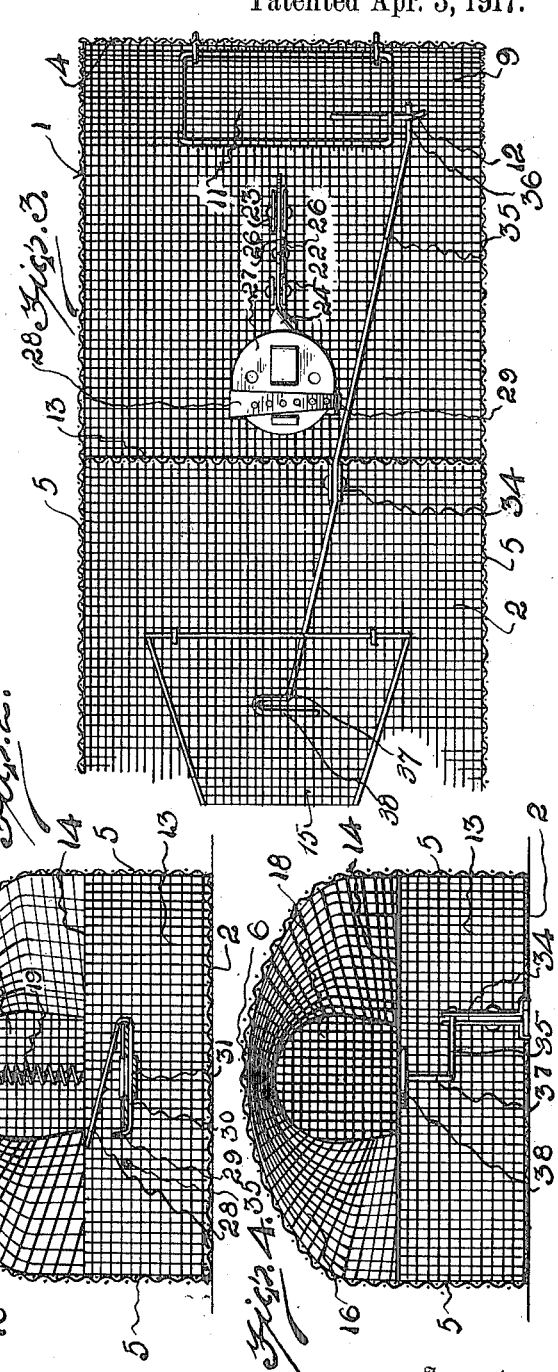
Witnesses
R. K. Stevens.
Inventor
L. L. Graham.
By [signature]
Attorney

UNITED STATES PATENT OFFICE.

LINWOOD L. GRAHAM, OF CADES, SOUTH CAROLINA.

ANIMAL-TRAP.

1,221,312. Specification of Letters Patent. Patented Apr. 3, 1917.

Application filed October 27, 1915. Serial No. 58,269.

*To all whom it may concern:*

Be it known that I, LINWOOD L. GRAHAM, a citizen of the United States, residing at Cades, in the county of Williamsburg, State of South Carolina, have invented certain new and useful Improvements in Animal-Traps; and I do hereby declare the following to be a full, clear, and exact description of the invention, such as will enable others skilled in the art to which it appertains to make and use the same.

The present invention is directed to improvements in animal traps, and has for its object to provide a device of this character constructed in such a manner that a trapped animal will reset the trap, whereby the trap may be left for a period without attention.

A further object of the invention is to provide a novel form of trip for releasing the trap door.

A still further object of the invention is to provide a novel form of bait pan so constructed that the bait can be firmly attached thereto so that the animal in attempting to remove the bait will positively operate the tripping device.

With these and other objects in view, this invention resides in the novel features of construction, formation, combination and arrangement of parts to be hereinafter more fully described, claimed and illustrated in the accompanying drawings, in which:

Figure 1 is a longitudinal sectional view through the trap with the resetting lever shown partly in dotted lines.

Fig. 2 is a sectional view on line 2—2 of Fig. 1.

Fig. 3 is a sectional view on line 3—3 of Fig. 1.

Fig. 4 is a sectional view on line 4—4 of Fig. 1.

The trap comprises a body 1 which is formed from wire mesh and comprises a bottom 2, ends 3 and 4, sides 5 and a top 6, the end 3 being provided with a door opening 7 through which the trapped animals are removed, said door opening being normally closed by the door 8, while the end 4 has its lower portion inclined downwardly, as at 9, said portion having an opening 10 formed therein which is normally closed by the trap door 11, the upper edge of which is hingedly connected to the end 11, said door being provided at one side with a pin 12, the purpose of which will later appear.

A wire mesh partition 13 extends transversely of the body 1 and has its lower edge terminating in a tapered platform 14 which is disposed horizontally and has hingedly connected thereto a section 15. A wire mesh hood 16 is provided and is also tapered to conform to the shape of the platform 14 and its hingedly connected section 15. Thus it will be seen that the platform 14 forms a bottom for the hood 16, and that the section 15 normally closes the opening 17 located between the forward edge of the platform and end 18 of the hood. The section 15 is normally held closed by the coil spring 19, which has its upper end connected to the top of the hood and its lower end connected to the section 15 adjacent its pivot connection.

By providing the partition 13 the body 1 is divided into a trapping chamber 20 and bait chamber 21, the latter having mounted therein uprights 22 and 23 which pivotally support the levers 24 and 25, respectively, said levers having their adjacent ends pivotally connected by a link 26.

Fixed to the upper end of the lever 24 is a pan 27, said pan having connected thereto a resilient finger 28 which extends transversely of the pan and is adapted to have its free end spring under the catch 29 which is formed upon one end of the plate 30 which is formed integral with the finger and is engaged in the slots 31 formed in the pan, said finger being adapted to hold the bait firmly in place. The outer end of the lever 25 is beveled, as at 32, whereby the free edge of the door 11 can ride thereover either to its open or closed position. The pan 27 is held in a normally horizontal position by the coil spring 33 which has its upper terminal connected to the top of the trap 1 and its lower terminal connected to the outer end of the lever 25, said spring serving to return the pan to its horizontal position after the same has been swung downwardly by the weight of an animal which will crawl upon the pan in an attempt to get the bait, or will in some other manner exert weight thereon so as to rock the lever 25 through the medium of the link 26.

After the animal has been trapped in the chamber 21 it will in an attempt to escape pass to the platform section 15, which being yieldably supported will precipitate the animal through the opening 17 and into the chamber 20, and since the section 15 will automatically close said opening it is obvious that the animal cannot pass back into the chamber 21.

Mounted in the chamber 20 and adjacent the partition 13 is a post 34 which pivotally supports the lever 35, said lever having the end adjacent the door 11 provided with a curved section 36, while the end under the section 15 terminates in a vertical offset 37, the upper end of which is coiled as at 38 for slidably engaging the inner surface of the section 15. Thus it will be seen that when the section 15 is tilted downwardly that the lever 35 will be rocked, thus causing the curved section thereof to slidably engage the pin 12, which action will swing the door 11 to its open or set position, and at which time the free edge thereof engages the adjacent end of the lever 25. It will thus be noted that the animal in passing from the bait chamber 21 to the chamber 20 will automatically swing the door 11 to its open position so that other animals can enter the bait chamber.

What is claimed is:—

An animal trap comprising a cage-like body, a transverse partition mounted therein, a horizontal platform supported by the partition and having a hingedly connected section carried thereby, levers pivotally supported in the body and having their adjacent ends pivotally connected by a link, a trap door hingedly connected to one end of the body and adapted to have its free edge engaged with the end of one of the levers to hold the door in its open position, a bait pan carried by the other lever which when moved downwardly by the animal will rock the levers to release the door, and means operatively connecting the section and trap door for moving said door into engagement with the adjacent lever when the said section is tilted downwardly.

In testimony whereof, I affix my signature, in the presence of two witnesses.

LINWOOD L. GRAHAM.

Witnesses:
O. E. JOHNSON,
H. S. B. JOHNSON.